United States Patent [19]

Dittmer et al.

[11] Patent Number: 4,852,646
[45] Date of Patent: Aug. 1, 1989

[54] THERMALLY CONDUCTIVE GEL MATERIALS

[75] Inventors: Catherine A. Dittmer, Half Moon Bay; Robert S. Dubrow, Redwood City, both of Calif.

[73] Assignee: Raychem Corporation, Menlo Park, Calif.

[21] Appl. No.: 63,552

[22] Filed: Jun. 16, 1987

[51] Int. Cl.⁴ .............................................. H01L 23/40
[52] U.S. Cl. .................................. 165/185; 165/80.2; 165/1; 174/76
[58] Field of Search .................... 165/185, 133, 905, 1, 165/80.2, 134.1; 174/76

[56] References Cited

U.S. PATENT DOCUMENTS

| | | | |
|---|---|---|---|
| 4,574,879 | 3/1986 | DeGree et al. | 165/185 |
| 4,604,424 | 8/1986 | Cole et al. | 524/862 |
| 4,610,738 | 9/1986 | Jervis | 174/76 X |
| 4,639,829 | 1/1987 | Ostergren et al. | 165/185 X |
| 4,715,430 | 12/1987 | Arnold et al. | 165/185 X |
| 4,721,832 | 1/1988 | Toy | 174/87 |

FOREIGN PATENT DOCUMENTS

| | | |
|---|---|---|
| 58-21899 | 2/1983 | Japan . |
| 58-21900 | 2/1983 | Japan . |
| 58-101498 | 6/1983 | Japan . |
| 1492285 | 10/1975 | United Kingdom . |

Primary Examiner—Larry Jones
Attorney, Agent, or Firm—Bernard J. Lyons; Herbert G. Burkard

[57] ABSTRACT

This invention provides new heat transfer materials comprising gels and particulate fillers and having a composite heat transfer coefficient greater than 2 watts/m-° K. and preferably greater than 15. The materials are easily conformable to irregularly shaped surfaces and have low TO-3 thermal impedance values, e.g., less than 0.5 at 300 psi mounting pressure.

26 Claims, 3 Drawing Sheets

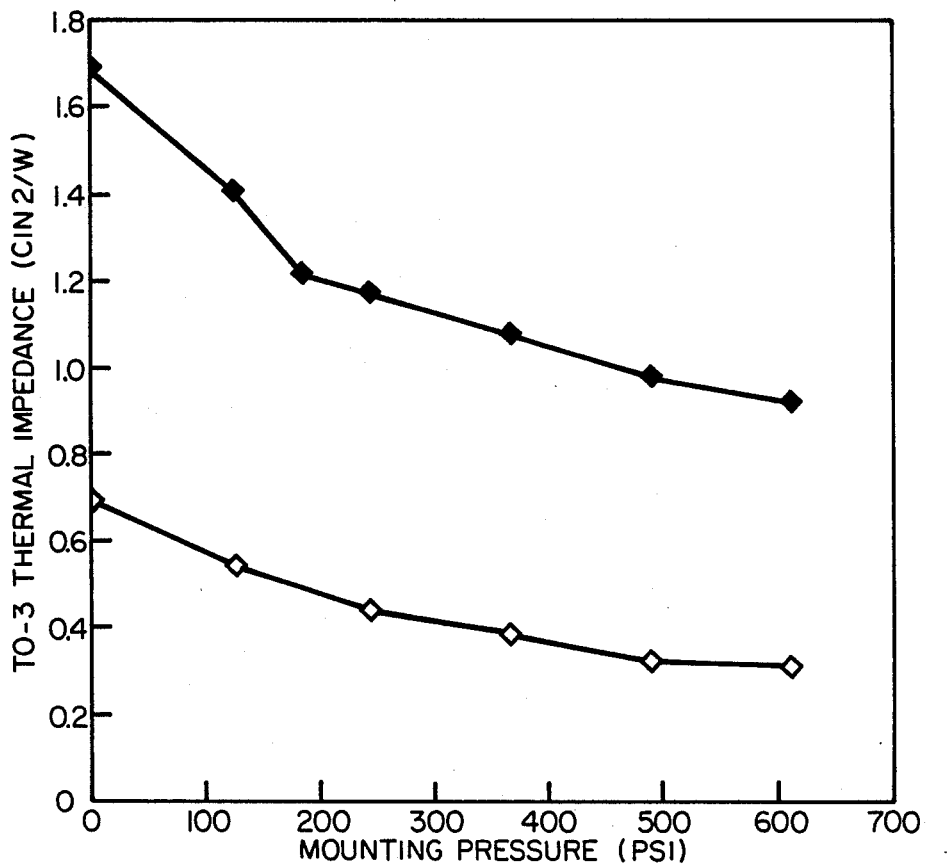
FIG_1

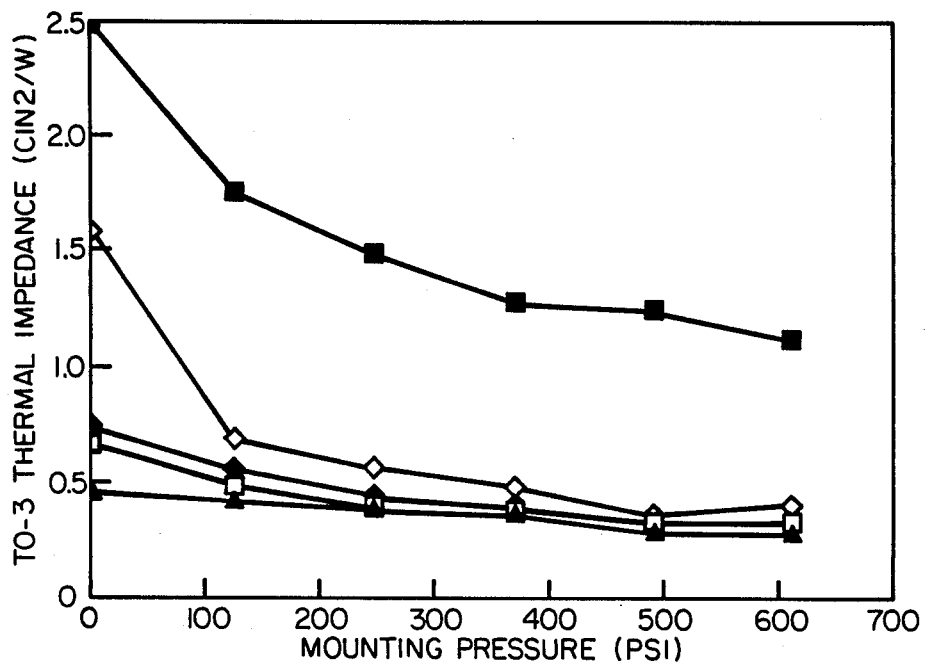
FIG_2

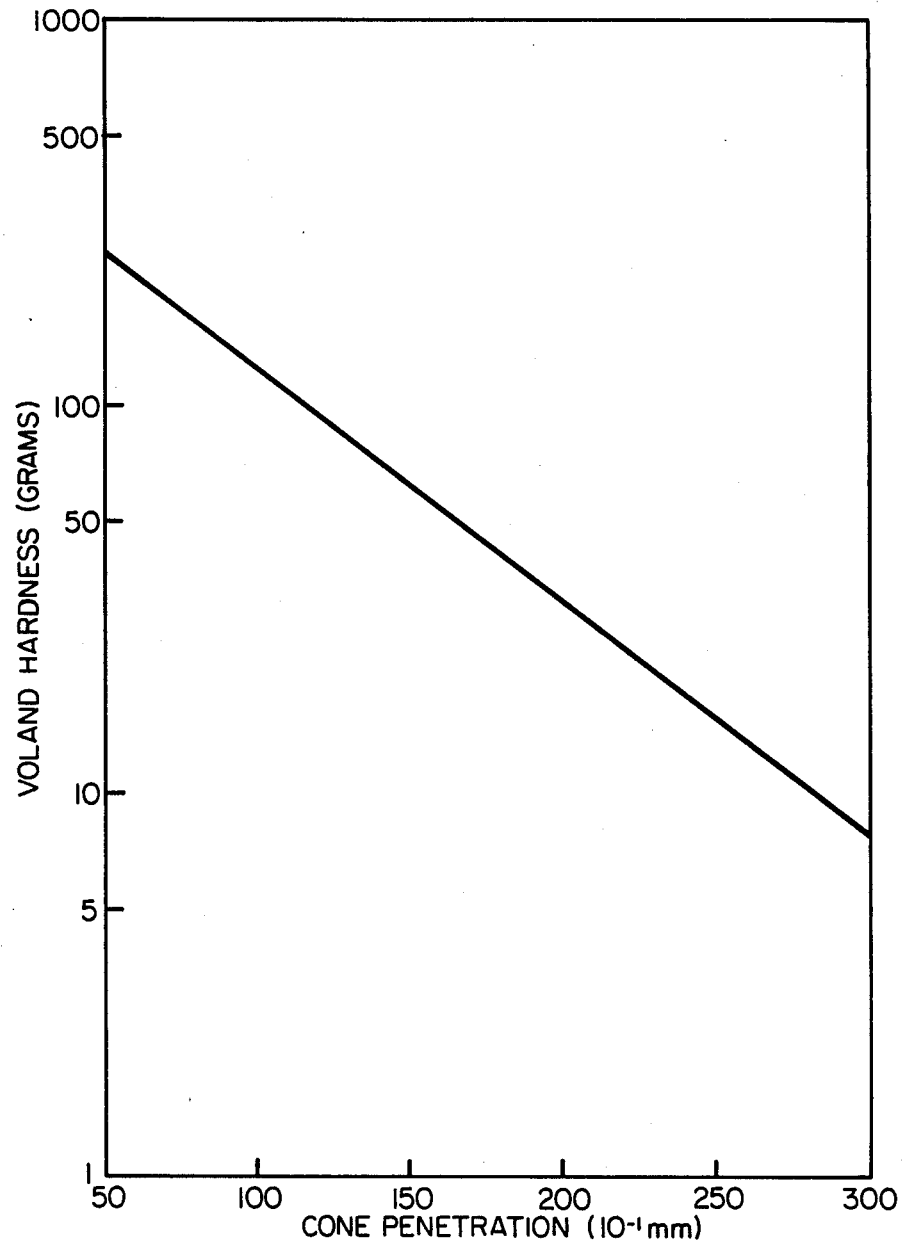
FIG_3

THERMALLY CONDUCTIVE GEL MATERIALS

FIELD OF THE INVENTION

This invention relates to thermally conductive compositions, materials and articles and methods of use thereof.

BACKGROUND OF THE INVENTION

Various compositions have been used to aid in the conduction of heat from one surface to another surface. For example, in electrical devices it is important to conduct heat from circuit boards and components to a metal plate or cooling device which can then remove the heat from the electrical device. Elastomeric compositions have been used which contain various additives and fillers which increase the thermal conductivity of the elastomers. Such elastomers are illustrated in U.S. Pat. No. 4,604,424 to Cole et al. Thermally conductive elastomers which typically have a Shore A durometer hardness in the range of about 50 are relatively hard and lack the sufficient conformability to easily conform to irregular shaped substrates, such as printed circuit boards containing transistors, resistors, diodes and other electrical components thereon. Such conductive elastomers require high pressure compression, typically in the range of 300 psi to 500 psi, to assure the desired contact with the substrate from which or to which heat is being conducted. Therefore, such elastomers are typically not suited for direct contact with electronic components for aiding in the removal of heat.

Various grease materials and pastes have been prepared using similar thermally conductive fillers. However, such greases and pastes have the disadvantages of migrating into unwanted areas over time, particularly at elevated temperatures, thus contaminating other areas of the device and causing a loss of the desired thermal conductivity, and of being very difficult to handle when reentering the electrical device for repair or replacement. This is due to the fact that the grease or paste is difficult to clean from the surfaces on which it has been placed.

In some instances the thermal conductivity of thermally conductive elastomers have been enhanced by using a thermally conductive grease to aid in the surface contact of the elastomer with the substrate. Other interface materials have been used as well. As with using a grease the disadvantage of such interface materials is that it is difficult to clean such materials from the substrate such as an electronic device when reentry and removal of the conductive elastomer is necessary for repair or replacement.

SUMMARY OF THE INVENTION

In one aspect this invention provides a cured composition comprising:
(a) a gel material having a cone penetration value of about 50 to about 350 ($10^1$ mm) and an ultimate elongation of at least about 50%; and
(b) dispersed in said gel material a particulate filler having a thermal conductivity of at least about 10 watts/m-°K.; wherein the filler is present in an amount between 5% and 70% by weight of the composition.

In another aspect this invention provides an article comprising a flexible matrix impregnated with a cured composition comprising:

(a) a gel material having a cone penetration value of about 50 to about 350 ($10^1$ mm) and an ultimate elongation of at least about 50%; and
(b) dispersed in said gel material a particulate filler having a thermal conductivity of at least about 10 watts/m-°K.; wherein the filler is present in an amount between 5% and 70% by weight of the composition.

In another aspect this invention provides a method of aiding in heat transfer in electrical and other devices comprising:
placing on a first substrate from which or to which heat is to be conducted a layer of a cured composition comprising:
(a) a gel material having a cone penetration value of about 50 to about 350 ($10^1$ mm) and an ultimate elongation of at least about 50%; and
(b) dispersed in said gel material a particulate filler having a thermal conductivity of at least about 10 watts/m-°K.; wherein the filler is present in an amount between 5% and about 70% by weight of the composition;
applying to the exposed surface of said composition a second substrate from which or to which heat is to be transferred; and
applying a desired pressure to the composition between the two substrates to obtain the desired heat transfer.

In another aspect this invention provides a method of aiding in heat transfer in electrical and other devices comprising:
placing on a first substrate from which or to which heat is to be conducted an article comprising a flexible matrix impregnated with a cured composition comprising:
(a) a gel material having a cone penetration value of about 50 to about 350 ($10^1$ mm) and an ultimate elongation of at least about 50%; and
(b) dispersed in said gel material a particulate filler having a thermal conductivity of at least about 10 watts/m-°K.; wherein the filler is present in an amount between 5% and about 70% by weight of the composition;
applying to the exposed surface of said article a second substrate from which or to which heat is to be transferred; and
applying a desired pressure to the article between the two substrates to obtain the desired heat transfer.

BRIEF DESCRIPTION OF THE DRAWINGS

FIG. 1 shows the comparative thermal impedance at various mounting pressures of a prior art conductive elastomer and a conductive gel of the present invention.

FIG. 2 shows the comparative thermal impedance at various mounting pressures of an elastomer and gel materials having varying hardnesses.

FIG. 3 shows the direct correlation of the ASTM D217 cone penetration and hardness measured by the Voland/Stevens Texture Analyzer for gel materials of the type useful in the present invention.

DESCRIPTION OF THE INVENTION

The compositions and articles of the present invention comprise (a) a gel material having a cone penetration of about 50 to 350 ($10^1$ mm) as measured by ASTM D217 and an ultimate elongation of at least 50% as measured by ASTM D412 and (b) a particulate filler material present up to about 70% by weight wherein the particulate material has a thermal conductivity, typically at least greater than 10 watts/m-°K. whereby the composition has the desired thermal impedance recited above in the summary of the invention. The gel material useful in the present invention may be any composition or material having the cone penetration and ultimate elongation physical properties specified above. Such materials may be polyurethanes, silicones, polyolefinic block copolymers and other compositions which provide the above cone penetration and elongation properties necessary for the gel material to have high conformability under low compression forces to provide the good surface contact and sealing to the surfaces between which the thermally conductive materials of this invention is placed or compressed. Such gel materials have been used to protect substrates from corrosion and to provide electrical insulation on certain electrical terminals and connectors to prevent electrical malfunction upon exposure to moisture. For example, such gel materials have been used in terminal lug protection caps for the telecommunication industries as shown in U.S. Pat Nos. 4,600,261 and 4,634,207; in crimp connectors as shown in U.S. Ser. No.. 507,433 filed June 23, 1983; in covers for metal articles as shown in U.S. Ser. No. 715,789 filed Mar. 25, 1985; in thermoformed articles as shown in U.S. Ser. No. 730,699 filed May 2, 1985, in splice case end seals as shown in U.S. Ser. No. 698,643 filed Feb. 6, 1985 and U.S. Ser. No. 730,697 filed May 2, 1985, in tape forms as shown in U.S. Ser. No. 507,435 filed June 26, 1983, Ser. No. 711,119 filed Mar. 12, 1985, Ser. No. 730,692 filed May 2, 1985, and Ser. No. 730,405 filed May 2, 1985, and in tape forms having a protective backing as shown in U.S. Ser. No. 864,689 filed May 19, 1986. Examples of such gel compositions and materials are shown in the above patents and applications and in U.S. Ser. No. 730,402 filed May 2, 1985, U.S. Ser. No. 801,018 filed Nov. 22, 1985, and UK Ser. No. 8617559 filed July 18, 1986. Such gel compositions and materials have been used as shielding and sealing gaskets as illustrated in U.S. Ser. No. 002,827 filed Jan. 13, 1987. The disclosures of the above patents and applications, which are all commonly assigned with this application, are incorporated herein by reference.

The gels useful in the present invention in general have a cone penetration value from about 50 to about 350 ($10^{-1}$ mm). In many uses it is preferred that the gel have a cone penetration between about 100 and 300 and in some applications it is preferred that the cone penetration be between about 150 and about 250. The gels when used in relatively thin layers, such as at least 0.002 in., preferably at least 0.005 in., and can be typically in the range of 0.010 in. to 0.050 in., with appropriate covering layer may provide superior surface contact and conformability when the cone penetration is between about 150 and about 250. The ultimate elongation of the gel material should be at least 50% in order to provide good conformability with the surface of the substrate without tearing or breaking. Higher values are generally preferred in order to provide better sealing of the gel material to the surface of the substrate. It is generally preferred that the gel material have an elongation of at least 100% and in many applications an elongation of at least 200% is desired. In some applications it is preferred that the gel material have an elongation of about 250% to about 350%.

The particulate filler material useful in the present invention can be any particulate type material which is compatible with the gel materials which have the cone penetration and elongation values specified above and which, when combined with said gel material, provide a composition having a TO-3 thermal impedance of less than about 1.1° C.-in$^2$/watt at a mounting pressure of 300 psi. It is preferred that the composition have such thermal impedance value at 300 psi less than about 1.0, more preferred less than about 0.9 and particularly preferred less than about 0.8. It is also particularly preferred that the composition have a TO-3 thermal impedance of less than about 1.5° C.-in$^2$/watt at zero psi mounting pressure and more particularly preferred having such thermal impedance less than about 1.3 and most particularly having such thermal impedance at less than about 1.1 and in some applications less than about 1.0.

The particulate filler material can be of any physical shape and form desired to provide the above thermal impedance values of the gel-particulate filler composition. For example the particulate fillers may be powders of varying particle sizes and the particles may be of any desired shape such as round, irregular, flake or platelet type particles, cubic, hexagonal or other shaped depending on the processing used to prepare the particulate filler and in some cases depending upon the crystal structure of the particulate filler used. In some cases it may be desired to use a particulate filler which is in the form of short fibers such as chopped fibers or in the form of short needles or whiskers provided that the length and stiffness thereof do not interfere with the conformability of the composition to the shape of the surface on which the composition is intended to be used for aiding in heat transfer. The particulate materials useful in the gel compositions of this invention can also be preformed into matrix forms such as woven, nonwoven, mat, sheet or other form provided that the preformed particulate material is porous enough for sufficient impregnation by the liquid gel material before it is cured and provided that the preformed particulate material is sufficiently flexible to conform as desired as part of the gel composition of tis invention.

The particulate filler materials useful in the present invention may be conventional thermally conductive fillers which, when combined with the gel materials as described above, provide a composition having the properties set forth above. Particularly preferred are those conductive materials which have a thermal conductivity greater than about 100 watts/m-°K. such as aluminum nitride, the cubic form of boron nitride and synthetic diamonds. Less preferred but useful in the present invention are those materials having thermal conductivity of at least about 20 watts/m-°K. such as alumina, hexagonal form of boron nitride and the like. Other conventional fillers which are useful in the present invention include zinc oxide, ferric oxide, berylia, magnesia, magnesium oxide and the like. Materials having a thermal conductivity of at least about 10 watts/m-°K. are useful in the compositions of the present invention.

The particulate fillers useful in the present invention may be electrically insulative, such as most of the above examples or may be electrically conductive, such as metal or graphite, in the particulate forms described above. And the particulate fillers described herein can be used in various mixtures to provide the desired properties according to the teachings of the present invention.

The particulate filler can constitute more than 5% and up to about 70% by weight of the gel-filler composition, preferably about 10% to about 60% by weight of the composition, and most preferably about 20% to about 50% by weight of the gel-filler composition. It should be noted that when the particulate fillers described above are combined with the gel materials described above and having particulate cone penetration and ultimate elongation values the presence of the particulate filler material in the gel will typically lower the cone penetration and ultimate elongation values for that particular gel. However, it is important to note that the gel-filler composition should remain within the general gel properties set forth above, i.e., have a cone penetration value of at least about 50 ($10^{-1}$ mm) and an ultimate elongation of at least about 50% in order to provide the desired conformability to the various surfaces and substrates on which the composition of this invention may be used. It has surprisingly been found that the gel materials described above can be loaded with such high proportions of particulate filler and still maintain the gel properties in terms of the cone penetration and ultimate elongation values specified above. It had previously been found that when certain additives, such as carbon black per se, were used at relatively low levels, such as 5% by weight, were added to the gel the resultant material would not have the desired cone penetration and/or ultimate elongation properties.

The gel-particulate filler compositions of this invention may be used per se or may be used in combination with a carrier strip or matrix to support the composition, particularly when the composition of this invention has a low tensile strength and high surface tack and is therefore difficult to handle. The support materials may be any matrix material such as an open cell flexible foam material, a woven or nonwoven fabric, and the like. In order to use a support structure for the composition of this invention, it is necessary that such structure or material be capable of being impregnated with the liquid gel-filler composition before the composition is cured and that the support material be sufficiently flexible so as not to interfere with the conformability of the compositions of this invention when they are used on a desired surface or substrate.

The support matrix material can also be selected to have a high thermal conductivity and thereby not interfere with or detract from the desirable thermal conductivity properties of the compositions of the present invention. Any support matrix material physically compatible with the gel-filler composition and with the conformability requirements dictated by the intended use. However, using a low thermal conductivity material will lower the performance while a high thermal conductivity material will enhance overall performance. For example a woven fabric of graphite fibers would provide enhanced thermal conductivity in the present invention. When a support matrix such as a fabric is used, it is preferred that the support matrix material have a minimum thermal conductivity of at least 2 watts/m-°K., more preferably greater than about 10 watts/m-°K., most preferably greater than about 20 watts/m-°K., and particularly preferred greater than about 50 watts/m-°K.

The "TO-3 thermal impedance" referred to in the present specification and claims means the thermal impedance of °C.-in$^2$/watt using a standard test fixture for a TO-3 Motorola 2N3055 for determining thermal impedance in accordance with the procedures described in "Thermal Performance of Heat Transfer Materials Under Actual Operating Conditions" by Miksa de Sorgo and Thomas Ouellette (1985 SATECH Conference, Chicago, Ill.). Since thermal impedance is sensitive to the pressure at which the conductive material is mounted on the test surface, thermal impedance values are given at specified mounting pressures ranging from zero to about 700 psi or greater. Prior art thermally conductive elastomeric materials are typically characterized in terms of thermal impedance at a mounting pressure between about 300 psi and about 500 psi. This has been necessary because the hardness of the prior art elastomeric materials which require high compressive mounting forces to obtain good surface contact and conformability between the thermally conductive material and the substrate test surface. While the compositions of the present invention are equally useful at high mounting pressures such as 500 psi and above, where they provide lower thermal impedance than prior art materials, the compositions and materials of the present invention are also particularly useful at low mounting pressures and exhibit low thermal impedance at even zero mounting pressure. This capability of the compositions and materials of the present invention make them particularly useful not only in conventional applications but also in thermal contact with delicate electronic components which cannot physically withstand the forces involved in higher mounting pressures. The thermal impedance values are obtained by testing a sample material which has a thickness of about 0.005 inches to about 0.015 inches. For example, the test data in this application was obtained using test samples which were 0.010 inches to 0.015 inches in thickness; however, it should be noted that since the compositions and materials of the present invention have much lower overall thermal impedance than prior art materials, the materials of the present invention can be used in thicker layers for better conformability to the substrate and for better exclusion of air from the space where the heat is to be transferred from, thus resulting in more efficient heat transfer even with thicker layers of the thermally conductive materials of the present invention than with thin layers of prior art materials.

The cone penetration values referred to for the gel materials of the present invention are measured as specified in ASTM D217. It has also been found useful to measure the hardness and other properties of the gels useful in the present invention and the compositions of the present invention using a Voland/Stevens Texture Analyzer Model LFRA equipped with a one-fourth inch diameter ($\frac{1}{4}$") stainless steel ball probe. For measuring the hardness of the gel materials of the present invention a 20 ml glass scintillating vile containing 10 grams of gel is placed in the Voland/Stevens Texture Analyzer and the one-fourth inch stainless ball probe is forced into the gel at a speed of 0.2 mm per second to a penetration distance of 4.0 mm. The hardness value of the gel is the force in grams required to force the ball probe at that speed to penetrate or deform the surface of the gel the specified 4.0 mm. This value is referred to as the "Voland Hardness in Grams". The Voland hardness is directly correlated to the ASTM D217 cone penetration hardness and this correlation is shown in FIG. 3. While this correlation is represented as a distinct line, it will be recognized by those skilled in the art that the correlation is accurate within the measurement accuracy of and reproducibility of the measurements of both the Voland hardness and the cone penetration. (The Voland/Stevens Texture Analyzer is available from Voland Corp., Hawthorne, N.Y. 10532-1002.)

EXAMPLE 1

A sample was prepared by mixing a commercially available two part addition cure polydimethylsiloxane gel which has a starting viscosity of 600 CPS before gelation (and a cone penetration of 260 ($10^{-1}$ mm) when gelled). Part A, which contains a vinyl terminated polydimethylsiloxane, and Part B, which contains a hydride functionalized polydimethylsiloxane were mixed together along with 50% by weight (based on the total composition) of Dow Chemical's 5-10 micron aluminum nitride powder. These components were blended in a rotary mixer then poured into a 0.015 inch deep mold and cured at 150° C. to form a sheet. The cured composition had a Voland hardness of 39 grams (cone penetration of about 183 ($10^{-1}$ mm)), an elongation of about 300% and a tensile strength of about 7.0 psi. The TO-3 thermal impedance was measured for this material and the results set forth in FIG. 1 along with the TO-3 thermal impedance of a prior art material which is a fiberglass fabric reinforced boron nitride filled silicone elastomer available commercially as Cho-Therm 1678 (trademark) available from Chomerics, Inc., Grace Co., Hudson, N.H. 03051 and is described in Chomerics Product Bulletin No. 44 (1985) as having a Shore A hardness of 90, an elongation of 10% and tensile strength of 1000 psi.

EXAMPLE 2

Example 1 was repeated preparing four samples but varying the ratio of vinyldimethyl (Part A) and hydride curing agent (Part B) to provide gel samples containing aluminum nitride having a Voland hardness of 29 grams, 39 grams, 121 grams, and about 220 grams. The TO-3 thermal impedance of these four samples is shown in FIG. 2 along with a prior art silicone rubber (Dow 182 having a Shore A hardness when cured per se of about 50 to 60) filled with 50% by weight aluminum nitride resulting in a composition having Shore A hardness when cured of about 70 to 80. The gel material having the Voland hardness of about 220 grams had a relatively high thermal impedance at zero mounting pressure but exhibited low thermal impedance upon an increase in mounting pressure.

We claim:
1. An assembly comprising:
a first substrate and a second substrate;
said first substrate being maintained by resistive heating at a higher temperature than said second substrate;
said first substrate comprising an electrical component; and,
placed between and in heat transferring contact with said first and second substrates an article comprising a flexible carrier supporting a thermally conductive cured composition comprising:
(a) a gel material having a cone penetration value of about 50 to 350 ($10^{-1}$ mm) and an ultimate elongation of at least about 50%; and
(b) dispersed in said gel material a particulate filler having a thermal conductivity of at least about 10 watts/m-°K.; wherein the filler is present in an amount between 5% and about 70% by weight of the composition;
whereby heat is conducted from said first substrate to said second substrate.

2. An assembly according to claim 1 wherein the particulate filler is present in an amount up to about 60% by weight.

3. An assembly according to claim 2 wherein the filler is present in an amount up to about 50% by weight.

4. An assembly according to claim 3 wherein the filler is a metal nitride.

5. An assembly according to claim 4 wherein the filler is aluminum nitride.

6. An assembly according to claim 1 wherein said filler is electrically insulative.

7. An assembly according to claim 1 wherein said layer is under a mounting pressure of up to about 300 psi.

8. An assembly according to claim 1 wherein said first substrate is a circuit board containing said electrical component.

9. An assembly according to claim 8 wherein said second substrate is a metal plate.

10. An assembly according to claim 8 wherein said second substrate is a cooling device.

11. An assembly according to claim 1 wherein said gel comprises a silicone composition.

12. An assembly according to claim 1 wherein said electrical component is selected from the group consisting of transistors, resistors and diodes.

13. An article comprising a flexible matrix impregnated with a cured composition comprising:
(a) a gel material having a cone penetration value of about 50 to about 350 ($10^1$ mm) and an ultimate elongation of at least about 50%; and
(b) dispersed in said gel material a particulate filler having a thermal conductivity of at least about 10 watts/m-°K.; wherein the filler is present in an amount between 5% and 70% by weight of the composition.

14. An article according to claim 13 wherein the matrix material comprises a fibrous material.

15. An article according to claim 14 wherein the matrix material comprises a woven fibrous material.

16. An article according to claim 14 wherein the matrix material comprises a nonwoven fibrous material.

17. A method of aiding in heat transfer comprising:
placing on a first substrate from which or to which heat is to be conducted an article comprising a flexible carrier supporting a thermally conductive cured composition comprising:
(a) a silicone gel material having a cone penetration value of about 50 to 350 ($10^{-1}$ mm) and an ultimate elongation of at least about 50%; and
(b) dispersed in said gel material a particulate filler having a thermal conductivity of at least about 10 watts/-°K.; wherein the filler is present in an amount between 5% and about 70% by weight of the composition;
applying to the exposed surface of said article a second substrate from which or to which heat is to be transferred; and
applying a desired pressure to the article between the two substrates to obtain the desired heat transfer.

18. A method of aiding in heat transfer comprising:
placing on a first substrate from which or to which heat is to be conducted an article comprising a flexible matrix impregnated with a thermally conductive cured conductive composition comprising:

(a) a gel material having a cone penetration value of about 50 to 350 ($10^{-1}$ mm) and an ultimate elongation of at least about 50%; and (b) dispersed in said gel material a particulate filler having a thermal conductivity of at least about 10 watts/m-°K.; wherein the filler is present in an amount between 5% and about 70% by weight of the composition;

applying to the exposed surface of said article a second substrate from which or to which heat is to be transferred; and applying a desired pressure to the composition between the two substrates to obtain the desired heat transfer.

19. An assembly comprising:

a first substrate, from which heat generated by resistive heating is to be conducted, and which comprises a transistor, a resistor or a diode;

a second substrate to which heat is to be conducted; and placed between and in heat transferring contact with said first and second substrates an article comprising a flexible carrier supporting a thermally conductive cured composition comprising:

(a) a gel material having a cone penetration value of about 50 to 350 ($10^{-1}$ mm) and an ultimate elongation of at least about 50%; and (b) dispersed in said gel material an electrically insulative particulate filler having a thermal conductivity of at least about 10 watts/m-°K.; wherein the filler is present in an amount between 5% and about 70% by weight of the composition.

20. An assembly comprising:

a first substrate comprising an electrical component, from which or to which heat is to be conducted and which is mounted on a circuit board; and, a second substrate to which or from which heat is to be conducted; and placed between and in heat transferring contact with said first and second substrates, an article comprising a flexible carrier supporting a thermally conductive cured composition comprising:

(a) a gel material having a cone penetration value of about 50 to 350 ($10^{-1}$ mm) and an ultimate elongation of at least about 50%; and (b) dispersed in said gel material an electrically insulative particulate filler having a thermal conductivity of at least about 10 watts/m-°K.;

wherein the filler is present in an amount between 5% and about 70% by weight of the composition.

21. An assembly according to claim 20 wherein said filler has a thermal conductivity of at least about 100 watts/m-°K.

22. A thermally conductive cured composition comprising:

(a) a gel material having a cone penetration value of about 50 to 350 ($10^{-1}$ mm) and an ultimate elongation of at least about 50%; and (b) dispersed in said gel material, an electrically insulative particulate filler having a thermal conductivity of at least about 100 watts/m-°K.; wherein the filler is present in an amount between 5% and about 70% by weight of the composition.

23. An article, for transferring heat from a first substrate to a second substrate, having a first surface and a second surface, both of said surfaces being adapted to be placed in heat transferring contact with said substrates, said article comprising a flexible carrier supporting an electrically insulating thermally conductive cured composition comprising:

(a) a gel material having a cone penetration value of about 50 to 350 ($10^{-1}$ mm) and an ultimate elongation of at least about 50%; and (b) dispersed in said gel material a particulate filler having a thermal conductivity of at least about 10 watts/m-°K.; wherein the filler is present in an amount between 5% and about 70% by weight of the composition.

24. An article according to claim 23 in the form of a sheet.

25. An article according to claim 24 wherein said cured composition is present on at least a part of each of said first and second surfaces.

26. An article according to claim 23 wherein said carrier has an ultimate elongation of at least about 50%.

* * * * *

UNITED STATES PATENT AND TRADEMARK OFFICE
CERTIFICATE OF CORRECTION

PATENT NO. : 4,852,646
DATED : August 1, 1989
INVENTOR(S) : Dittmer et al

It is certified that error appears in the above-indentified patent and that said Letters Patent is hereby corrected as shown below:

Column 1, line 59, replace "350 $(10^1 mm)$" by --350 $(10^{-1} mm)$ --.
Column 2, line 2, replace "350 $(10^1 mm)$" by --350 $(10^{-1} mm)$--.
Column 2, line 16, replace "350 $(10^1\ mm)$" by --350 $(10^{-1} mm)$--.
Column 2, line 37, replace "350 $(10^1 mm)$" by --350 $(10^{-1} mm)$ --.
Column 2, line 65, replace "350 $(10^1 mm)$" by --350 $(10^{-1} mm)$ --.
Column 8, line 32, replace "350 $(10^1 mm)$" by --350 $(10^{-1} mm)$ --.

Signed and Sealed this

Twentieth Day of June, 1995

Attest:

BRUCE LEHMAN

*Attesting Officer*    *Commissioner of Patents and Trademarks*